United States Patent Office 3,280,150
Patented Oct. 18, 1966

3,280,150
LACTONES OBTAINABLE FROM BIS(TRIFLUORO-METHYL)KETENE AND SELECTED DERIVATIVES THEREOF
David C. England and Carl G. Krespan, Wilmington, Del., assignors to E. I. du Pont de Nemours and Company, Wilmington, Del., a corporation of Delaware
No Drawing. Filed May 22, 1964, Ser. No. 369,588
19 Claims. (Cl. 260—343.5)

This application is concerned with, and has as its principal objects provision of, a novel condensation reaction of certain trifluoromethylketenes and novel perfluorinated organic compounds produced thereby.

In the copending application of Andreades and England (S.N. 283,958, filed May 29, 1963) it is shown that bis(perfluoroalkyl) ketenes differ sharply from other known ketenes in that they do not undergo the normal spontaneous dimerization which is characteristic of all previously known types of ketenes. For example, bis(trifluoromethyl)ketene is unchanged on storage at room temperature and even on heating for 8 hours at 200° C. At 300° C. it is partly isomerized to perfluoromethacrylyl fluoride.

It has now been discovered that perfluoroalkyltrifluoromethylketenes react in the presence of nucleophilic catalysts in liquid phase to form (a) the β-lactone of a 3-hydroxy-2,4-bis(trifluoromethyl)-2,4-bis(perfluoroalkyl)-3-butenoic acid:

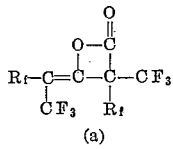
(a)

(b) the σ-lactone of a 3,5,5-trifluoro-5-hydroxy-4-trifluoromethyl-2,4-bis(perfluoroalkyl)-2-pentenoic acid:

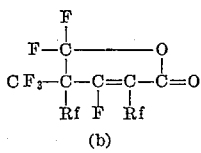
(b)

(c) the σ-lactone of a 3,3,5-trifluoro-5-hydroxy-2-trifluoromethyl-2,4-bis(perfluoroalkyl)-4-pentenoic acid:

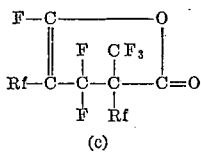
(c)

(d) a σ-lactone of a 3,5,5-trifluoro-5-hydroxy-2-trifluoromethyl-2,4-bis(perfluoroalkyl)-3-pentenoic acid:

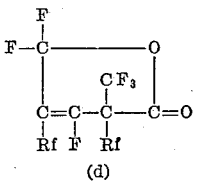
(d)

(e) a 1,3-bis(trifluoromethyl)-1,3-bis(perfluoroalkyl) allene:

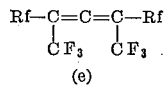
(e)

and (f) a 4-trifluoromethyl-2,4-bis(perfluoroalkyl)-2,3-butadienoic acid fluoride:

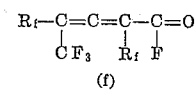
(f)

In these formulas $R_f$ is perfluoroalkyl of eight carbon atoms or less.

In the process of this invention all six types of products (a), (b), (c), (d), (e), and (f) are formed. While it is not desired to be bound by theoretical considerations, the following discussion is one plausible explanation of the simultaneous formation of these six types of products.

Nucleophilic attack on a perfluoroalkyltrifluoromethylketene may be visualized as giving rise to fluoride ion. Attack of fluoride ion on the ketene can be visualized as giving rise to an equilibrium between the ketene and the corresponding perfluoroalkylacrylyl fluoride. Attack of fluoride ion on either the ketene or the acid fluoride can give the same intermediate,

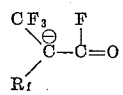

which can lose fluoride ion in two ways to give these two compounds. In the liquid phase this intermediate can attack a mole of ketene and product (a) is formed. Attack of the intermediate on a mole of perfluoroalkylacrylyl fluoride can give a mixture of (b), (c), and (d). Product (a) can be attacked further by fluoride ion to give (e) and $CO_2$ along with (b). Product (b) can be attacked further by fluoride ion to give (f) along with $COF_2$.

By control of the reaction conditions, it is possible to increase the yield of any one of the above desired products. Product (a) is favored by mild reaction conditions, i.e., low temperature, 0–30° C.; short reaction times, 5 minutes–1 hour; and low catalyst concentration, 0.01 to 0.5 mole per mole of ketene. Higher temperatures, 50–150° C.; longer reaction times, 1 hour to several days; and higher catalyst concentrations, 0.5–1.0 mole per mole ketene, tend to give (e) and $CO_2$ along with (b), (c), (d), (f) and $COF_2$. Products (b), (c), and (d) may be favored by adding preformed perfluoroalkylacrylyl fluoride to the reaction mixture.

Nucleophilic catalysts are compounds which have an affinity for positive ions or electron-deficient sites in a molecule. Preferred catalysts of this type are ammonium, alkylammonium, and alkali metal salts which contain one of the following anions: $F^-$, $Cl^-$, $Br^-$, $I^-$, $OH^-$, $OR^-$, $CN^-$, and $RCOO^-$, where R is a lower alkyl or aryl group. Representative nucleophilic catalysts suitable for use in the process of this invention include NaOH, KOH, NaCN, KCN, $LiOCH_3$, NaBr, CsF, KF, KI, $(C_2H_5)_4NCl$,

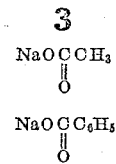

NaOC₆H₅ and NH₄F.

The temperature at which the reaction of this invention is carried out may be varied widely, temperatures in the range from −20° C. to 200° C. being operable. Temperatures in the range from 0° C. to 100° C. are preferred and room temperature is most preferred because of convenience.

Pressures both above and below atmospheric pressure are operable in the process of this invention. Because of the relative volatility of some of the reactants and products in this process, pressures in the range from atmospheric pressure up to 10 atmospheres are generally preferred.

The reaction of this invention takes place in the liquid phase. This liquid phase may be obtained by selecting a temperature and pressure of operation at which at least one of the reactants or products is liquid. Optionally a liquid diluent which is inert to the reactants and products may be added. It is preferred to use a diluent in which the nucleophilic catalyst is soluble. Suitable diluents for this purpose include the dimethyl ethers of ethylene glycol and diethylene glycol, acetonitrile, methylene chloride, chlorobenzenes, dimethylformamide, nitromethane, and tetramethylene sulfone.

In the following examples parts are by weight.

EXAMPLE I

A mixture of 150 parts of bis(trifluoromethyl)ketene, 95 parts of the dimethyl ether of diethylene glycol, and 30 parts of cesium fluoride is sealed into a glass reactor and heated in a steam bath for about 18 hours. The reaction mixture is then cooled to −80° C., transferred to a distillation pot, and distilled. Among other products there is separated 23 parts of tetrakis(trifluoromethyl)-allene boiling at 41° C. It is characterized by elemental analysis, infrared absorption, and n-m-r spectrum.

EXAMPLE II

A mixture of 175 parts of bis(trifluoromethyl)ketene, 48 parts of the dimethyl ether of diethylene glycol, and 10 parts of cesium fluoride is sealed in a glass reactor and allowed to stand at room temperature for about 18 hours. The reaction mixture is removed from the reactor and distilled to obtain 53 parts of tetrakis(trifluoromethyl) allene, B.P. 41° C., along with higher boiling products.

EXAMPLE III

A mixture of 300 parts of bis(trifluoromethyl)ketene, 48 parts of the dimethyl ether of diethylene glycol, and 5 parts of cesium fluoride is sealed in a glass reactor. In a second glass reactor is sealed 330 parts of bis(trifluoromethyl)ketene, 48 parts of the dimethyl ether of diethylene glycol, and 5 parts of cesium fluoride. The reactors are held at room temperature for about 18 hours, then cooled to −80° C., and the contents removed and combined in a distillation pot. Distillation yields 260 parts of recovered bis(trifluoromethyl)ketene, 170 parts of the β-lactone of 3-hydroxy-2,2,4,4-tetrakis(trifluoromethyl)-3-butenoic acid and 7 parts of tetrakis(trifluoromethyl)allene and 2,4,4-tris(trifluoromethyl)-2,3-butadienoic acid fluoride.

EXAMPLE IV

A mixture of 580 parts of bis(trifluoromethyl)ketene, 95 parts of the dimethyl ether of diethylene glycol, and 10 parts of cesium fluoride is sealed in a glass container and vigorously agitated at room temperature for about 18 hours. The reaction mixture is then cooled to −80° C., transferred to a distillation pot, and distilled. There is obtained 70 parts of recovered bis(trifluoromethyl)ketene, 210 parts of tetrakis(trifluoromethyl)allene, and 200 parts of the σ-lactone of 3,5,5-trifluoro-5-hydroxy-2,4,4-tris(trifluoromethyl)-2-pentenoic acid.

EXAMPLE V

A glass reactor is charged with 340 parts of bis(trifluoromethyl)ketene, 5 parts of tetraethylammonium chloride and 67 parts of methylene chloride. The assembly is cooled in a bath of liquid nitrogen and sealed. It is allowed to warm to about 25° C. and is agitated gently at that temperature for about 16 hours. The reactor is then opened and the contents distilled. The center cut consists of 310 parts of the β-lactone of 3-hydroxy-2,2,4,4-tetrakis(trifluoromethyl)-3-butenoic acid in the form of a colorless liquid, B.P. 93° C., $n_D^{25}$ 1.3082. It absorbs strongly in the infrared at $5.1\mu$ (several shoulders) and at $5.85\mu$. The $F^{19}$ n-m-r consists of three general areas in the ratio of 1:1:2 (quartet, overlapping quartet with septet, and quartet).

*Analysis.*—Calcd. for $C_8F_{12}O_2$: C, 26.99; F, 64.04. Found: C, 27.43; F, 64.09.

EXAMPLE VI

Part A

A glass reactor is charged with 770 parts of bis(trifluoromethyl)ketene, 20 parts of tetraethylammonium chloride and 134 parts of methylene chloride, cooled in a bath of liquid nitrogen and sealed. It is warmed to about 25° C. and agitated gently at that temperature for about 16 hours. It is then cooled to −80° C., and the reaction mixture is transferred to a still pot and distilled. After removal of unreacted ketene (310 parts) and a foreshot (54 parts) there is obtained 122 parts of tetrakis(trifluoromethyl)allene in the form of a colorless liquid, B.P. 41° C. It absorbs at $4.95\mu$ in the infrared. The $F^{19}$ n-m-r is a single sharp peak at −182 c.p.s. from $Cl_2CF-CCl_2F$ (ext.) at 56.4 mc.

*Analysis.*—Calcd. for $C_7F_{12}$: C, 26.95; F, 73.08. Found: C, 27.08; F, 73.32.

Part B

Continuing the distillation from Part A there is obtained an intermediate portion (55 parts, containing some β-lactone of 3-hydroxy-2,2,4,4-tetrakis(trifluoromethyl)-3-butenoic acid) followed by 245 parts of the σ-lactone of 3,5,5-trifluoro-5-hydroxy-2,4,4-tris(trifluoromethyl)-2-pentenoic acid in the form of a colorless liquid, B.P. 113° C., $n_D^{25}$ 1.3260. It absorbs at 5.5 and $5.9\mu$ in the infrared. The $F^{19}$ n-m-r consists of four general areas in the ratio of 3:6:2:1; a doublet ($J=38$ c.p.s.); a quadruplet (overlapping doublet, $J=14$ c.p.s., and triplet, $J=14$ c.p.s.); a septet ($J=14$) further split into doublets ($J=8$ c.p.s.) and a complex multiplet formed from a quadruplet ($J=38$ c.p.s.) being further split into septets ($J=14$ c.p.s.) and triplets ($J=8$ c.p.s.).

*Analysis.*—Calcd. for $C_8F_{12}O_2$: C, 26.99; F, 64.04. Found: C, 27.48; F, 63.93.

EXAMPLE VII

Part A

A mixture of 180 parts of bis(trifluoromethyl)ketene, 180 parts of perfluoromethacrylyl fluoride, 0.5 part of tetraethylammonium chloride, and 13 parts of methylene chloride is sealed into a glass reactor. An exothermic reaction occurs and after it subsides, the mixture is allowed to stand at room temperature for about 18 hours. The reaction mixture is removed and distilled to obtain a mixture of products boiling in the range from 49–104° C. By gas-phase chromatography this mixture is separated into the β-lactone of 3-hydroxy-2,2,4,4-tetrakis(trifluoromethyl)-3-butenoic acid, the σ-lactone of 3,5,5 - trifluoro - 5 - hydroxy - 2,4,4 - tris(trifluoromethyl) - 2-pentenoic acid, the σ-lactone of 3,3,5-trifluoro-5-hydroxy-2,2,4-tris(trifluoromethyl)-4-pentenoic acid, the σ-lactone of 3,5,5 - trifluoro - 5 - hydroxy - 2,2,4 - tris(trifluoromethyl)-3-pentenoic acid, tetrakis(trifluoromethyl)allene, and 2,4,4-tris(trifluoromethyl)-2,3-butadienoic acid fluoride.

*Part B*

The fraction of the σ-lactone of 3,3,5-trifluoro-5-hydroxy-2,2,4-tris(trifluoromethyl)-4-pentenoic acid obtained in Part A above is characterized by infrared absorption at 5.4μ (lactone carbonyl) and 5.75μ (C=C). The $F^{19}$ n-m-r absorption shows four peaks in the area ratio of 3:6:1:2 representing $CF_3$, $(CF_3)_2$, CF, and $CF_2$. Their locations with respect to $Cl_2CF$–$CCl_2F$ are, respectively, in cycles per second at 56.4 mc., −444, −145, +574, and +1660. The fine structure is as follows: a doublet (J=22 c.p.s.) into triplets (J=8 c.p.s.), a triplet (J=13 c.p.s.); a quartet (J=22 c.p.s.) into triplets (J=14 c.p.s.); and a complex multiplet.

*Analysis.*—Calcd. for $C_8F_{12}O_2$: C, 26.99; F, 64.04. Found: C, 27.23; F, 63.69.

EXAMPLE VIII

A mixture of 100 parts of the β-lactone of 3-hydroxy-2,2,4,4-tetrakis(trifluoromethyl)-3-butenoic acid, one part of cesium fluoride, and 9.5 parts of the dimethyl ether of diethylene glycol is sealed in a glass reactor and kept at room temperature for 48 hours. The reaction mixture is cooled to −80° C. and opened. By infrared absorption, $CO_2$ and $COF_2$ are detected in the off-gases. Distillation of the remainder yields a mixture of products boiling from 34–114° C. By infrared absorption and gas chromatography, the mixture is shown to consist of the recovered β-lactone of 3-hydroxy-2,2,4,4-tetrakis(trifluoromethyl)-3-butenoic acid, the σ-lactone of 3,5,5-trifluoro-5-hydroxy-2,4,4-tris(trifluoromethyl)-2-pentenoic acid, the σ-lactone of 3,5,5-trifluoro-5-hydroxy-2,2,4-tris(trifluoromethyl)-3-pentenoic acid, tetrakis(trifluoromethyl)allene, and 2,4,4-tris(trifluoromethyl)-2,3-butadienoic acid fluoride.

EXAMPLE IX

A mixture of 360 parts of perfluoromethacrylyl fluoride and 5 parts of cesium fluoride is heated in a glass reactor. Within a few minutes, a vigorous exothermic reaction occurs. When this has subsided, the reaction product is distilled to obtain a mixture of products boiling from below room temperature to 104° C. The presence of $CO_2$ and $COF_2$ is demonstrated in the off-gases by infrared absorption. By infrared absorption and gas chromatography, the distillate is shown to contain unreacted perfluoromethacrylyl fluoride along with the β-lactone of 3-hydroxy-2,2,4,4-tetrakis(trifluoromethyl)-3-butenoic acid, the σ-lactone of 3,5,5-trifluoro-5-hydroxy-2,4,4-tris (trifluoromethyl)-2-pentenoic acid, the σ-lactone of 3,5,5-trifluoro-5-hydroxy-2,2,4-tris(trifluoromethyl)-3-pentenoic acid, tetrakis(trifluoromethyl)allene and 2,4,4-tris(trifluoromethyl)-2,3-butadienoic acid fluoride.

EXAMPLE X

To a solution of 5 parts of tetraethylammonium chloride in 134 parts of methylene chloride is added a solution of 500 parts of perfluoromethacrylyl fluoride in 401 parts of methylene chloride. After a few minutes of stirring at room temperature, the mixture warms spontaneously to reflux temperature. After about one-half hour, the refluxing subsides and a small upper liquid layer is separated and discarded. Methylene chloride is removed from the lower layer by distillation and further distillation yields 390 parts of a mixture boiling at 103–114° C. consisting of the σ-lactone of 3,5,5-trifluoro-5-hydroxy-2,4,4-tris(trifluoromethyl)-2-pentenoic acid (366 parts) and the σ-lactone of 3,5,5-trifluoro-5-hydroxy-2,2,4-tris(trifluoromethyl)-3-pentenoic acid (24 parts). Fractional distillation and gas phase chromatography are used to effect a separation of the isomers. The former is described in Example VI, Part B. The latter absorbs at 5.5 and 5.75μ in the infrared. The $F^{19}$ n-m-r consists of four general areas in the ratio of 3:2:6:1; a doublet (J=20 c.p.s.) into triplets (J=7 c.p.s.); a doublet (J=14 c.p.s.) into quartets (J=7 c.p.s.); a doublet (J=13 c.p.s.) and a complex multiplet. These peaks are centered respectively from fluorotrichloromethane at 3350, 3428, 3628 and 5255 c.p.s. at 56.4 mc.

*Analysis.*—Calcd. for $C_8F_{12}O_2$: C, 26.99; F, 64.04. Found: C, 27.27; F, 63.86.

EXAMPLE XI

A mixture of 166 parts of the σ-lactone of 3,5,5-trifluoro - 5-hydroxy-2,4,4-tris(trifluoromethyl)-2-pentenoic acid, 5 parts of cesium fluoride, and 9.5 parts of the dimethyl ether of diethylene glycol is heated together in a glass reactor. Slow distillation converts the liquid reaction mixture to $COF_2$ and 91 parts of 2,4,4-tris(trifluoromethyl)-2,3-butadienoic acid fluoride.

EXAMPLE XII

A vertical quartz tubular reactor is packed with short quartz cylinders and fitted at the bottom with a receiver cooled by liquid nitrogen. The packed zone of the reactor is heated to 550° C. and the system is held at 2 mm. pressure. Into the top of this reactor is introduced in very slow stream 87 parts of the σ-lactone of 3,5,5-trifluoro - 5-hydroxy-2,4,4-tris(trifluoromethyl)-2-pentenoic acid. The product collecting in the bottom receiver is allowed to warm to room temperature, during which time $COF_2$ is given off. There remains 69 parts of crude 2,4,4-tris(trifluoromethyl)-2,3-butadienoic acid fluoride which is purified by gas-phase chromatography. On infrared analysis, it shows absorption at 5.0μ (allene) and 5.45μ (carbonyl). The $F^{19}$ n-m-r spectrum shows three peaks in the ratio of 6:3:1, respectively a singlet, a doublet, and a quadruplet.

*Analysis.*—Calcd. for $C_7F_{10}O$: C, 28.99; F, 65.52. Found: C, 29.27; F, 65.35.

The products of this invention are useful for imparting water repellency to paper and textile materials. This is illustrated as follows. Parts of sample strips of filter paper are soaked, respectively, with the β-lactone of 3-hydroxy-2,2,4,4-tetrakis(trifluoromethyl)-3-butenoic acid, the σ-lactone of 3,5,5-trifluoro-5-hydroxy-2,4,4-tris(trifluoromethyl)-2-pentenoic acid and 2,4,4-tris(trifluoromethyl)-2,3-butadienoic acid fluoride. The papers are exposed to the air at room temperature until dry. Treated and untreated portions of the dried papers are identical in outward appearance. The papers are then all dipped in water. Treated portions of all three papers show no water absorption or loss of strength; whereas, untreated portions absorb water readily and become soaked and weakened.

The compounds of this invention are also useful as solvents for low-melting tetrafluoroethylene polymers. For example, the σ-lactone of 3,5,5-trifluoro-5-hydroxy-2,4,4-tris(trifluoromethyl)-2-pentenoic acid and the σ-lactone of 3,5,5-trifluoro-5-hydroxy-2,2,4-tris(trifluoromethyl)-3-pentenoic acid are employed, respectively, as solvents for a solid low molecular weight polytetrafluoroethylene. These solutions (ca. 10% by weight) are used to impregnate strips of paper and cotton cloth with the polymer, which is insoluble in common solvents. The strips are then dried in a current of air to remove solvent. The resulting strips when dipped in water do not absorb water nor lose strength.

The perfluoroalkyltrifluoromethylketene starting materials, i.e., compounds of the formula $R_fC(CF_3)$=C=O where $R_f$ is as defined above, are prepared by the pyrolysis/dehydration of the corresponding α-perfluoroalkyl-α-trifluoromethylacetic acids ($R_fCH(CF_3)COOH$) in the presence of a chemical dehydrating agent such as $P_2O_5$.

The pyrolysis is effected by mixing the α-hydrobis(perfluoroalkyl)carboxylic acid and $P_2O_5$, normally with no modifier or chemical reaction media, although such which are chemically inactive under the conditions applied obviously can be used, and heating with or without mixing means at temperatures in the range 200–350° C., for times of the order of 0.5–12 hours or more while collecting the pyrolyzed or dehydrated product, i.e., the bis(perfluoroalkyl)ketene, in a cold trap connected to the pyrolysis zone. Continuous operations are of benefit when longer chain perfluoroalkyl substituents are involved. In these instances the contact time for the reactants under the temperature conditions called for will be extremely short, i.e., of the order of a few seconds to at most a few minutes. Normally the reaction will be effected in glass or other conventional equipment fabricated from materials resistant to and non-reactive with the highly fluorinated intermediates and final products. The isolation of the product is effected by providing a collection zone connected integrally with the pyrolysis zone and cooled externally.

The process conditions necessary for the above-described dehydration/pyrolysis reaction will vary as a function of the length of the carbon chains of the $R_f$ radicals. As the carbon chain content of the $R_f$ radicals increases, it will be preferred to effect the reaction at reduced pressures, e.g., desirably of the order of 50 to 200 mm. of mercury, and also to operate at temperatures below 300° C.

The bis(perfluoroalkyl)-substituted α-hydroacetic acids are prepared from the corresponding 2,2-bis(perfluoroalkyl)difluoroethylenes in either of two ways. Thus, the 2,2-bis(perfluoroalkyl) 1,1-difluoroethylene can be hydrolyzed with water and/or an aqueous acidic solution in tetrahydrofuran according to the following:

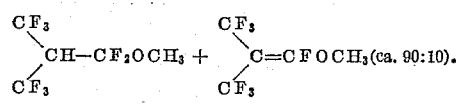

This technique functions best with those compounds wherein the $R_f$ radicals are of relatively low carbon content.

The α,α-bis(perfluoroalkyl)-α-hydroacetic acid intermediates can also be prepared in a three-stage synthesis which is preferable for those compounds wherein the $R_f$ radicals contain from 3–8 carbons. This 3-stage preparation also starts from the corresponding 2,2-bis(perfluoroalkyl)difluoroethylene intermediates and is properly representable by the following:

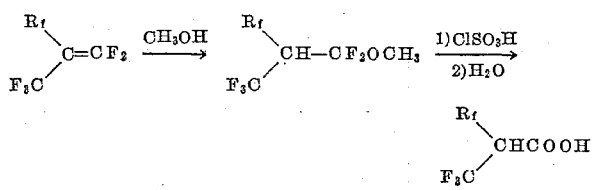

wherein $R_f$ is as previously defined.

EXAMPLE A

Part A

A gas (approximate composition 18% perfluoroisobutene (PFIB) and 82% perfluorocyclobutane) is passed through a cold mixture of tetrahydrofuran and water and then through methanol. A series of three 500-ml. gas-washing bottles cooled in ice baths is used. In each bottle the gas passes through a sintered-glass disc and is then bubbled through the liquid present. Each of the first two bottles contains a mixture of tetrahydrofuran and water (100 ml. of each). The third bottle contains 200 ml. of methanol. In five hours 206 l. of gas has been scrubbed which corresponds to about 1.5 moles of PFIB. The methanol in the third scrubber is mixed with an equal amount of water and the heavy layer distilled to yield 165 g. (0.7 mole) of

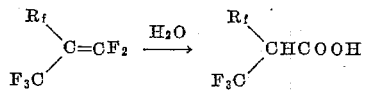

Both of the tetrahydrofuran:water scrubbers contain two phases. They are combined and the lower layer (500 cc.) separated from the upper (200 cc.). To the lower layer is slowly added 500 cc. conc. $H_2SO_4$ and the mixture continuously extracted with methylene chloride (about 500 cc.) overnight. Distillation of the extract yields 121 g. (0.62 mole) of α-hydrohexafluoroisobutyric acid, boiling point 90° C./190 mm. which solidifies at room temperature. Recrystallized from hexane, the acid melts at 50° C.

Part B

α-Hydrohexafluoroisobutyric acid (196 g.) which has been ground in a mortar is mixed well with 284 g. of phosphorus pentoxide in a 2-l. one-neck flask with some cooling in a cold water bath. After mixing, the material is spread evenly over the bottom half of the flask. A cold-water condenser with a solid carbon dioxide trap attached is then connected to the flask which is then heated strongly for about four hours at about 200–300° C. Bis(trifluoromethyl)ketene collects in the solid carbon dioxide trap. A total of 110 cc. (about 175 g.; impurity 2–3% $POF_3$) is collected. On distillation through a low-temperature still the pure bis(trifluoromethyl)ketene boils at +5° C.; yield 168 g.

When reacted in essentially the same manner as described in Example A, the following intermediates produce the following enumerated bis(perfluoroalkyl)ketene starting materials for the present invention. Thus, on acid hydrolysis of 2-trifluoromethylperfluorobutene, there is obtained pentafluoroethyltrifluoromethylacetic acid, i.e., 2H-perfluorobutanecarboxylic acid, from which by pyrolysis/dehydration there is obtained pentafluoroethyltrifluoromethylketene. Similarly, from 2-difluoromethylenedecafluoro-n-pentane, there is obtained α-trifluoromethyl-α-heptafluoro-n-propylacetic acid, from which by pyrolysis/dehydration there is obtained trifluoromethylheptafluoro-n-propylketene. Similarly, from 2-difluoromethylenedodecafluorohexane, there is obtained nonafluorobutyltrifluoromethylacetic acid, i.e., 2-dodecafluorohexanecarboxylic acid, from which on pyrolysis/dehydration there is obtained nonafluorobutyltrifluoromethylketene. Similarly, from 2-trifluoromethyl-2-heptadecafluoro-n-octyl-1,1-difluoroethylene, there is obtained α-trifluoromethyl-α-heptadecafluoro-n-octylacetic acid, i.e., eicosafluoro-2-n-decanecarboxylic acid, from which there is obtained trifluoromethylheptadecafluoro-n-octylketene.

When the perfluoroalkyltrifluoromethylketene starting materials shown in column 1 of the table are substituted for the mixture of bis(trifluoromethyl)ketene and perfluoromethacrylyl fluoride in the procedure of Part A of Example VII, the 3-butenoic acid β-lactones, 2-pentenoic acid σ-lactones, 4-pentenoic acid σ-lactones, 3-pentenoic acid σ-lactones, perfluoroalkyl-substituted allenes and perfluoroalkyl-substituted 2,3-butadienoic acid fluorides indicated respectively in columns 2, 3, 4, 5, 6, and 7 of the table are obtained.

Since obvious modifications and equivalents will be evident to those skilled in the chemical arts, we propose to be bound solely by the appended claims.

TABLE

| Item | 1<br>Perfluoroalkyltri-fluoromethylketene | 2<br>Product (a), β-lactone of— | 3<br>Product (b), σ-lactone of— | 4<br>Product (c), σ-lactone of— |
|---|---|---|---|---|
| 1 | Pentafluoroethyltri-fluoromethylketene. | 3-hydroxy-2,4-bis(pentafluoro-ethyl)-2,4-bis(trifluoromethyl)-3-butenoic acid. | 3,5,5-trifluoro-5-hydroxy-2,4-bis-(pentafluoroethyl)-4-trifluoro-methyl-2-pentenoic acid. | 3,3,5-trifluoro-5-hydroxy-2,4-bis-(pentafluoroethyl)2-trifluoro-methyl-4-pentenoic acid. |
| 2 | Trifluoromethylhepta-fluoro-n-propyl-ketene. | 3-hydroxy-2,4-bis(trifluoromethyl)-2,4-bis(heptafluoro-n-propyl)-3-butenoic acid. | 3,5,5-trifluoro-5-hydroxy-2,4-bis-(heptafluoro-n-propyl)-4-trifluoro-methyl-2-pentenoic acid. | 3,3,5-trifluoro-5-hydroxy-2,4-bis-(heptafluoro-n-propyl)-2-trifluoro-methyl-4-pentenoic acid. |
| 3 | Nonafluorobutyltri-fluoromethylketene. | 3-hydroxy-2,4-bis(nonafluorobutyl)-2,4-bis(trifluoromethyl)-3-butenoic acid. | 3,5,5-trifluoro-5-hydroxy-2,4-bis-(nonafluorobutyl)-4-trifluoro-methyl-2-pentenoic acid. | 3,3,5-trifluoro-5-hydroxy-2,4-bis-(nonafluorobutyl)-2-trifluoro-methyl-4-pentenoic acid. |
| 4 | Trifluoromethyl-heptadecafluoro-n-octylketene. | 3-hydroxy-2,4-bis(trifluoromethyl)-2,4-bis(heptadecafluoro-n-octyl)-3-butenoic acid. | 3,5,5-trifluoro-5-hydroxy-2,4-bis-(heptadecafluoro-n-octyl)-4-trifluoromethyl-2-pentenoic acid. | 3,3,5-trifluoro-5-hydroxy-2,4-bis-(heptadecafluoro-n-octyl)-2-trifluoromethyl-4-pentenoic acid. |

| Item | 5<br>Product (d), σ-lactone of— | 6<br>Product (e), perfluoroalkylallene | 7<br>Product (f), perfluoroalkyl-2,3-butadienoic acid fluoride |
|---|---|---|---|
| 1 | 3,5,5-trifluoro-5-hydroxy-2,4-bis(pentafluoroethyl)-2-trifluoromethyl-3-pentenoic acid. | 1,3-bis(pentafluoroethyl)-1,3-bis(trifluoromethyl)allene. | 4-trifluoromethyl-2,4-bis(pentafluoroethyl)-2,3-butadienoic acid fluoride. |
| 2 | 3,5,5-trifluoro-5-hydroxy-2,4-bis(heptafluoro-n-propyl)-2-trifluoromethyl-3-pentenoic acid. | 1,3-bis(trifluoromethyl)-1,3-bis(heptafluoro-n-propyl)allene. | 4-trifluoromethyl-2,4-bis(heptafluoro-n-propyl)-2,3-butadienoic acid fluoride. |
| 3 | 3,5,5-trifluoro-5-hydroxy-2,4-bis(nonafluorobutyl)-2-trifluoromethyl-3-pentenoic acid. | 1,3-bis(nonafluorobutyl)-1,3-bis(trifluoromethyl)allene. | 4-trifluoromethyl-2,4-bis(nonafluorobutyl)-2,3-butadienoic acid fluoride. |
| 4 | 3,5,5-trifluoro-5-hydroxy-2,4-bis(heptadecafluoro-n-octyl)-2-trifluoromethyl-3-pentenoic acid. | 1,3-bis(trifluoromethyl)-1,3-bis(heptadecafluoro-n-octyl)allene. | 4-trifluoromethyl-2,4-bis(heptadecafluoro-n-octyl)-2,3-butadienoic acid fluoride. |

The embodiments of the invention in which an exclusive property or privilege is claimed are defined as follows:

1. The process of condensing a perfluoroalkyltrifluoromethylketene wherein the perfluoroalkyl group contains up to 8 carbons which comprises contacting the same, in liquid phase, with a nucleophilic catalyst.

2. The process of claim 1 wherein the ketene is bis(trifluoromethyl)ketene.

3. The process of condensing bis(trifluoromethyl)ketene which comprises contacting the same, in liquid phase, with cesium fluoride.

4. The process of condensing bis(trifluoromethyl)ketene which comprises contacting the same, in liquid phase, with tetraethylammonium chloride.

5. The process which comprises contacting perfluoromethacrylyl fluoride, in liquid phase, with a nucleophilic catalyst.

6. The process which comprises contacting perfluoromethylacrylyl fluoride, in liquid phase, with cesium fluoride.

7. The process which comprises contacting perfluoromethacrylyl fluoride, in liquid phase, with tetraethylammonium chloride.

8. The process which comprises contacting the β-lactone of 3 - hydroxy - 2,2,4,4 - tetrakis(trifluoromethyl)-3-butenoic acid, in liquid phase, with a nucleophilic catalyst.

9. The process which comprises contacting the σ-lactone of 3,5,5 - trifluoro - 5 - hydroxy - 2,4,4 - tris(trifluoromethyl) - 2 - pentenoic acid, in liquid phase, with a nucleophilic catalyst.

10. The β - lactone of a 3 - hydroxy - 2,4 - bis(trifluoromethyl) - 2,4 - bis(perfluoroalkyl) - 3 - butenoic acid, the perfluoroalkyl groups having up to 8 carbons.

11. The β - lactone of 3 - hydroxy - 2,2,4,4 - tetrakis(trifluoromethyl)-3-butenoic acid.

12. The σ - lactone of a 3,5,5 - trifluoro - 5 - hydroxy-4 - trifluoromethyl - 2,4 - bis(perfluoroalkyl) - 2 - pentenoic acid, the perfluoroalkyl groups having up to 8 carbons.

13. The σ - lactone of 3,5,5 - trifluoro - 5 - hydroxy-2,4,4-tris(trifluoromethyl)-2-pentenoic acid.

14. The σ - lactone of a 3,3,5 - trifluoro - 5 - hydroxy-2 - trifluoromethyl - 2,4 - bis(perfluoroalkyl) - 4 - pentenoic acid, the perfluoroalkyl groups having up to 8 carbons.

15. The σ - lactone of 3,3,5 trifluoro - 5 - hydroxy-2,2,4-tris(trifluoromethyl)-4-pentenoic acid.

16. The σ - lactone of a 3,5,5 - trifluoro - 5 - hydroxy-2 - trifluoromethyl - 2,4 - bis(perfluoroalkyl) - 3 - pentenoic acid, the perfluoroalkyl groups having up to 8 carbons.

17. The σ - lactone of 3,5,5 - trifluoro - 5 - hydroxy-2,2,4-tris(trifluoromethyl)-3-pentenoic acid.

18. A 4 - trifluoromethyl - 2,4 - bis(perfluoroalkyl) 2,3 - butadienoic acid fluoride, the perfluoroalkyl groups having up to 8 carbons.

19. 2,4,4 - tris(trifluoromethyl) - 2,3 - butadienoic acid fluoride.

References Cited by the Applicant

I. L. Knunyants et al.: Izvest. Akad, Nauk SSSR Ser. Khim. 1963, 1393–1397, No. 8 (translation).

I. L. Knunyants et al.: Izvest. Akad. Nauk SSSR Ser. Khim. 1963, 1573–1576, No. 9 (translation).

I. L. Knunyants et al.: Bull. Acad. Sci. (USSR) Div. Chem. Sci. 1960, 640–646 (translation).

T. L. Jacobs et al.: J. Am. Chem. Soc. 81, 606–610 (1959).

W. H. Knoth et al.: J. Am. Chem. Soc. 82, 3873–5 (1960).

H. E. Simmons et al.: J. Am. Chem. Soc. 82, 2292 (1960).

Miller: U.S. Patent 2,668,182 (1954).

WALTER A. MODANCE, *Primary Examiner.*

JAMES A. PATTEN, *Assistant Examiner.*